United States Patent Office 3,049,881
Patented Aug. 21, 1962

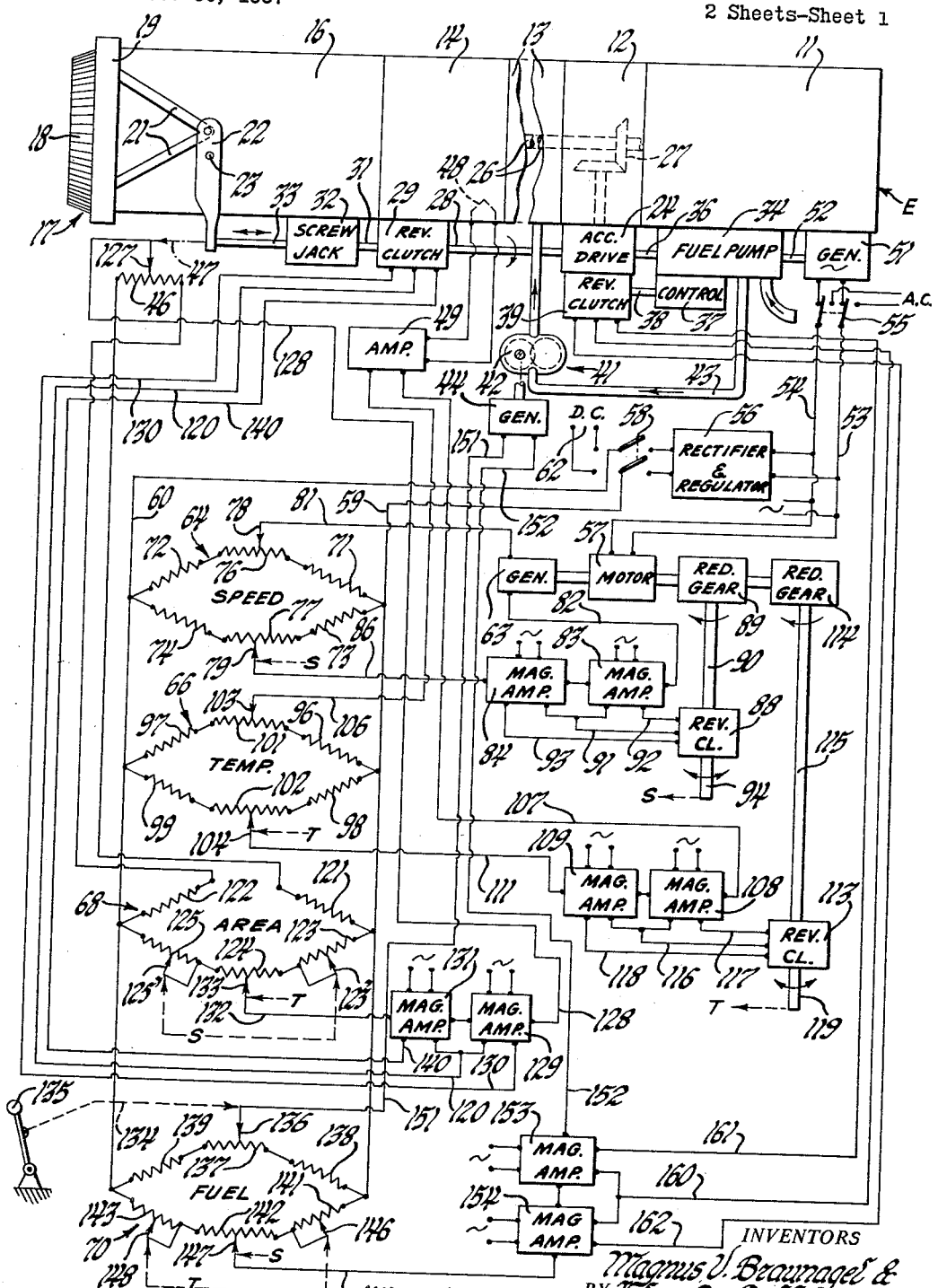

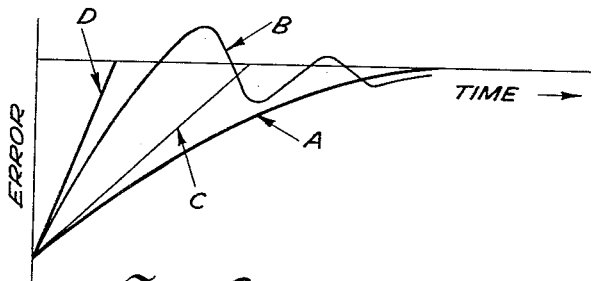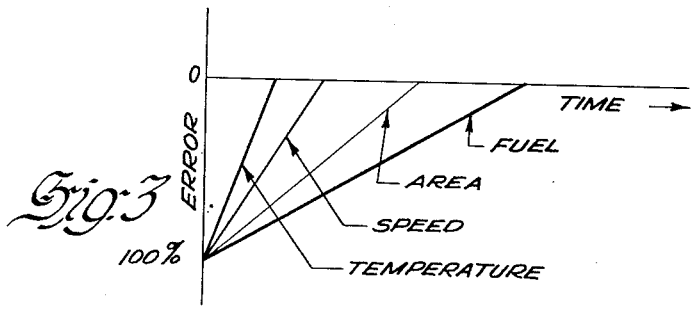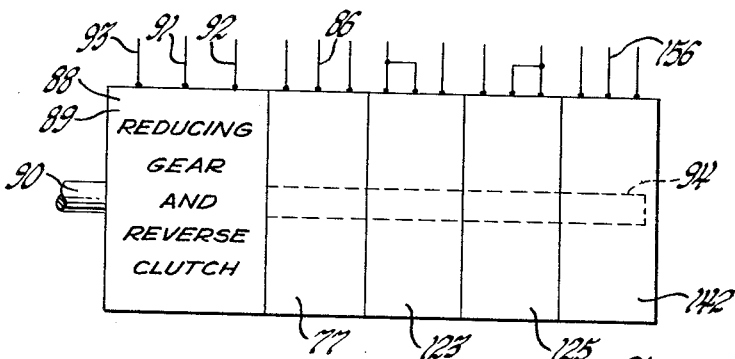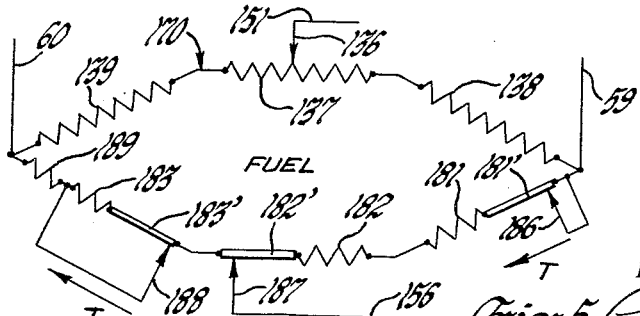

3,049,881
ENGINE CONTROL SYSTEM
Magnus V. Braunagel, Indianapolis, and John A. Dilley, Huntington, Ind., assignors to General Motors Corporation, Detroit, Mich., a corporation of Delaware
Filed Dec. 30, 1957, Ser. No. 706,188
14 Claims. (Cl. 60—39.28)

Our invention relates to engine control systems, and is particularly suited to controls for aircraft gas turbines. The invention is described in its preferred embodiment in the control for a turbojet engine. The control of aircraft gas turbines for best operating characteristics, fuel economy, and safety of the engine is very difficult. The difficulties arise from a number of factors. Among them are the fact that such engines frequently are operated at temperatures in the turbine approaching the maximum which the turbine can stand for an appreciable length of time. Relatively small overtemperatures may rapidly damage the turbine. A small amount of undertemperature very considerably reduces the efficiency and output of the engine.

Another problem arises from the very rapid acceleration of such engines in the higher speed ranges and the very high rate of increase of temperature which may occur if the fuel supply to the engine is rapidly increased, as it may be.

While the engine is capable of very quick changes in its mode of operation as regards temperature and speed of the turbine, for example, the measurement of the quantities which indicate the response of the engine is far from instantaneous. In other words, it is possible to vary the independent parameters, such as fuel flow and jet nozzle area, which determine the mode of operation of the engine, more quickly than the dependent parameters such as speed and temperature of the turbine, which indicate the mode of operation, can be measured.

The natural result of this condition is that it is extremely difficult to provide a stable control for an engine of this sort. Known control systems employing linear servomechanisms and measuring devices having a linear response characteristic are plagued with stability problems. The usual approach to the solution of such stability problems is the provision of still more complicated controls, usually embodying second order linear systems. These more complicated systems have not proved capable of coping successfully with all of the conditions that may arise in engine operation. Moreover, their complexity makes them more susceptible to malfunction of the control system itself.

The basic purpose of this invention is to provide simple and stable control systems, and particularly such systems adapted for control of turbojet engines and other gas turbines. This is accomplished by the employment of nonlinear servomechanisms providing an output from the sensing devices which measure the dependent parameters of engine operation and nonlinear servomechanisms to control the magnitude of the independent parameters such as fuel flow and jet nozzle area. These nonlinear servomechanisms are of a type having substantially constant velocity response, and the rates of response of the servomechanisms are coordinated so that the servomechanisms responding to the dependent parameters have a more rapid response than the servomechanisms controlling the independent parameters.

The nature of the invention and the advantages thereof will be clear to those skilled in the art from the succeeding description of the preferred embodiment of the invention and the accompanying drawings thereof.

FIGURE 1 is a schematic drawing of a turbojet control system embodying the invention.

FIGURE 2 is a graph illustrating various types of response characteristics.

FIGURE 3 is a chart illustrating the relation of response characteristics in a control system according to the invention.

FIGURE 4 is a somewhat schematic illustration of a servomotor with ganged potentiometers driven thereby.

FIGURE 5 is a partial schematic drawing illustrating speed and temperature limiting of fuel.

The principles of the invention may be clarified by reference to FIGURES 2 and 3. In FIGURE 2, response curves of error against time in response to a step change in the input function are illustrated for systems of various types. Curve A illustrates the response of a first order linear system. This is the exponential curve typical of the response of a thermocouple, for example. In this curve, the derivative of the curve or rate of change is proportional to the error.

Curve B illustrates the response of a typical second order linear system in which the constants are invariant as a function of either velocity or displacement. In general, a more rapid response is possible, but there is a tendency to overshoot and oscillate. The tendency to overshoot and oscillate may be reduced by damping at the expense of rapidity of response.

If linear servomechanisms are employed, because of the complex interaction of the independent and dependent parameters through the engine, which may have varying rates of response under different conditions, devising a control system which is stable under all conditions is very difficult. Such a control system will ordinarily be complex and the expedients resorted to to insure stability militate against rapid and precise operation of the control.

Curves C and D illustrate nonlinear response characteristics of the type employed in our control system which may be identified by the term "constant velocity response." In these cases, the rate of response is not a function of the magnitude of the error. The rate of response is substantially constant regardless of the magnitude of the error and is determined by the characteristics of the servomechanism. The difference between curves C and D lies in the greater response rate indicated by curve D.

FIGURE 3 illustrates the principle of the control system of this invention in terms of control of an engine in which rate of fuel supply to the engine and area of the exhaust nozzle are the independent parameters, that is, those controlled to determine the mode of engine operation, and turbine speed and turbine temperature are the dependent parameters, that is, those measured to ascertain the mode of engine operation and to limit or control in part the values of the independent parameters. Turbine temperature may be explained further by stating that it is a temperature representing the temperature of the turbine itself or the motive fluid of the turbine. Ordinarily, turbine temperature is measured by thermocouples in the motive gas stream entering or leaving the turbine.

FIGURE 3 illustrates constant velocity responses. It will be noted that the response rates of the fuel and area responses are less than those of the speed and temperature responses. By insuring that the response rates of the dependent parameters are greater than those of the independent parameters, stability is assured. The rate of response is independent of the magnitude of the error, being determined by the rate of movement characteristic of the servomechanism, which is either stationary or moving at this rate. The rates of movement of a particular servomechanism may, however, be made different for errors of opposite sign.

Since in the system according to the principles of this invention the response rates of the mechanisms measuring dependent parameters and the response rates of the mechanisms controlling independent parameters are fixed in any given set of circumstances, and the former are always greater than the latter, stability of the engine is made certain. Furthermore, this most important result may be achieved with a relatively simple control system.

An example of the application of the principles of the invention to control of a turbojet engine is depicted schematically in FIGURE 1, which shows a turbojet engine E comprising a compressor 11, a diffuser section 12, a combustion section 13, a turbine 14, and an exhaust duct 16. A variable jet nozzle mechanism 17 of any suitable type is provided. A nozzle such as that disclosed in U.S. Patent 2,828,602 is shown. Such a nozzle is varied in area by a number of pivoted flaps 18 moved inwardly or outwardly by a control ring 19 movable axially of the engine. The control ring is coupled by four links 21 to a yoke 22 rotatable about an axis defined by pivots 23 extending from each side of the exhaust duct. Nozzle area is varied by swinging the yoke about pivots 23.

The engine includes an accessory drive case 24 driven from the turbine shaft 26 through a power takeoff 27. The accessory drive provides mounting pads and power drives for various engine and aircraft service auxiliaries. In this system, the accessory drive provides power for variation of nozzle area through a shaft 28 connected through a reversing clutch mechanism 29 and shaft 31 to a screw jack 32. The screw jack 32 is coupled by a reciprocable rod 33 to the lower end of yoke 22. The reversing clutch and screw jack may be suitable commercially available mechanisms. The reversing clutch is electrically controlled, is capable of coupling shaft 28 to shaft 31 to drive the latter in either direction, and may decouple the two shafts. The reversing clutch and screw jack may be regarded as a nozzle area servomechanism.

The accessory drive mechanism drives an engine fuel pump 34 through a shaft 36. The fuel pump is of a positive displacement type, the displacement of which may be varied by mechanically shifting a part of the pump. Such pumps are well known. A control device 37, which mechanically shifts the displacement controlling mechanism of the pump in either direction, is operated through shaft 38 by a reversing clutch 39 driven from the accessory drive 24. This reversing clutch is capable of driving shaft 38 in either direction or declutching shaft 38 under electrical control. Control 37 and clutch 39 may be regarded as a fuel flow control servomechanism.

It will be seen from the foregoing that the two independent parameters of engine operation, fuel supply and nozzle area, may be controlled by energization of the reversing clutches 39 and 29. If either clutch is engaged, fuel flow or nozzle area is varied at a substantially constant rate determined by the mechanical structure and the rotational speed of the engine.

The values of fuel flow and nozzle area are determined by a computer or computing control mechanism which, as illustrated, responds to control by the aircraft pilot or flight engineer and to engine speed and turbine temperature. Also, as illustrated, the computer responds to feedback signals which inform the computer of the actual values of fuel flow and nozzle area. Since the preferred computer illustrated is of an electrical type, the input quantities must be electrical or be converted to electrical quantities.

Fuel flow is measured by a flow meter 41 which may be a positive displacement fluid motor 42 connected in the engine fuel line 43. Flow rate is converted to an E.M.F. proportional to flow by a D.C. tachometer type generator 44 driven by fluid motor 42.

Nozzle area feedback is provided as an electrical signal by a potentiometer 46, the slider or tap of which is coupled to the nozzle by any suitable mechanical connection indicated by 47. The potentiometer 46 may be so graduated or so coupled to the nozzle that the proportion of the voltage across the potentiometer taken off by the slider is proportional to nozzle area. This potentiometer may be mounted on the engine or in a computer assembly with the other potentiometers to be described.

Turbine temperature is measured by thermocouples 48 in the turbine inlet, only one of which is illustrated, which are connected to a suitable amplifier 49 which provides an amplified output in the form of a D.C. voltage proportional to turbine temperature.

An engine speed sense or input to the computer is provided by a mechanism including an A.C. tachometer generator 51 driven through shaft 52 from the accessory drive 24. It is a feature of the invention that the tachometer generator not only provides the speed input but also provides power for energization of the electrical circuits of the computer and power to drive servomechanisms within the computer. The generator 51 is connected through a switch 55 and leads 53 and 54 to a rectifier and regulator 56 and a synchronous motor 57, both in the computer. Switch 55 may be provided to connect leads 53 and 54 to a power source in the airplane, indicated by the legend A.C., while the engine is being started. The rectifier and regulator 56 includes suitable means for deriving a constant voltage direct current from the alternating current input. Preferably, the device 56 employs contact rectifiers and diodes, since these are more rugged than thermionic tubes. The regulated D.C. output is ordinarily connected by a double pole throw switch 58 to busses 59 and 60 which energize four computing bridge circuits, to be described. Switch 58 may be provided to connect busses 59 and 60 to an auxiliary D.C. supply 62 for starting the engine, since the generator 51 has no output until the engine has started. If switch 55 is provided, switch 58 may be omitted.

Synchronous motor 57 drives a D.C. tachometer generator 63 which provides an E.M.F. proportional to engine speed which is the speed sense or input to the speed bridge 64. The output of thermocouple amplifier 49 provides a temperature input to the temperature bridge 66. Area feedback potentiometer 46 provides an input to the area bridge 68. Generator 44 of flow meter 41 provides a feedback input to a fuel bridge 70.

The four bridge circuits 64, 66, 68, and 70 are standard Wheatstone bridge circuits energized from the constant voltage busses 59 and 60. All of these bridge circuits are self-balancing. Each bridge comprises four sides or legs and a diagonal or output circuit connecting junctions between the legs. Response to current in the output circuit operates a mechanism varying the resistance in two of the legs to rebalance the bridge.

Referring first to the speed bridge 64, the bridge comprises fixed resistances 71, 72, 73, and 74 and potentiometers 76 and 77 having movable arms or taps 78 and 79, respectively. The sides of the bridge are first, resistance 76 between resistance 71 and the portion of resistance 76 between resistance 71 and tap 78; second, the remainder of resistance 76 plus resistance 72; third, resistance 73 and the adjacent part of resistance 77 to tap 79, and fourth, the remainder of resistance 77 and resistance 74. The output circuit is connected between taps 78 and 79. Tap 78 is connected through lead 81, tachometer generator 63, lead 82, magnetic amplifiers 83 and 84, and lead 86 to tap 79. The voltage output of generator 63, which is proportional to engine speed, is subtracted from the potential difference between taps 78 and 79. The resultant E.M.F. causes a current flow in one direction or the other through magnetic amplifiers 83 and 84 (hereinafter called "magamps" in the interest of brevity).

Such magamps are well known devices. They are saturable reactor type transformers energized by alternating current. The output is controlled by a D.C. control winding. The characteristic of the magamps employed is such that the output is negligible when the direct current is zero or when it flows in one direction through the control winding. If the direct current flows in the other direction through the control winding, the output current increases very sharply. The power in the output circuit is much greater than that in the control winding. The magamps, therefore, serve the function of amplifiers. The amplifiers may also be regarded as a special type of polarized relay, but their characteristics are much superior to those of thermionic amplifiers or electromechanical relays. The magamps are both excited from an alternating current supply as indicated on the drawing. Preferably, the magamps are excited from lines 53 and 54, so that the entire electrical supply of the computer is taken from the generator 51 and is thus independent of the aircraft supply. This is indicated on the drawings by the branches of leads 53 and 54 and the exciting leads of the magamps, with the sine wave symbol. The control coils of the magamps are connected in reverse relation so that magamp 83 provides an output if current flows in one direction in the bridge output circuit and magamp 84 provides an output if current flows in the other direction in the bridge output circuit.

The output of each magamp is connected to one of the clutching coils in the reversing clutch 88. The reversing clutch 88 has characteristics similar to the reversing clutches 29 and 39 previously described. However, since its only function is to drive potentiometer arms, it would in practice be a miniature device suitable for instrument applications. Such devices are available commercially. The power input to reversing clutch 88 is provided from synchronous motor 57 which drives the reversing clutch through a reduction gear 89 and a shaft 90. In practice, the reduction gear may be a part of a common mechanical unit with the reversing clutch. One clutch coil of reversing clutch 88 is energized by magamp 83 through common lead 91 and lead 92. The other coil is energized by magamp 84 through common lead 91 and lead 93. The reversing clutch output shaft 94 remains stationary if neither clutch coil is engaged. It is driven in one direction or the other if one or the other of the clutch coils is energized. Shaft 94 is mechanically coupled to the arm 79 of potentiometer 77, as indicated by the legend S at shaft 94 and arm 79.

Assuming speed bridge 72 to be balanced, a change in engine speed will change the speed of generator 51, synchronous motor 57, and tachometer generator 63. The resulting change in E.M.F. of generator 63 will cause a current flow through the magamps, one of which will energize the reversing clutch 88 to cause shaft 94 to drive arm 79 in the direction to reduce the current in the bridge output circuit to zero. The position of arm 79, and, therefore, the rotational position of shaft 94, are thus a direct indication of engine speed. The slider 78 of potentiometer 76 may be adjusted to calibrate the bridge. Adjustment of slider 78 causes an adjustment of the datum position of speed shaft 94 so that it coincides throughout its range of rotation with the engine speed. The speed shaft 94 serves to provide inputs to the area bridge 68 and fuel bridge 70, as will be described.

The temperature bridge 66 also provides inputs to the area and fuel bridges. The structure and operation of this bridge and the means by which the self-balancing mechanism of the bridge provides a mechanical shaft rotation output are identical to those previously described in detail with respect to the speed bridge, the only significant difference being that the thermocouple amplifier 49 provides an E.M.F in the output circuit of the bridge instead of generator 63. Temperature bridge 66 comprises fixed resistances 96, 97, 98, and 99, a calibrating potentiometer 101 having an adjustable arm 103, and a feedback potentiometer 102 having an arm 104. The output circuit of this bridge is from arm 103 through lead 106, the output of thermocouple amplifier 49, lead 107, magamps 108 and 109, and lead 111 to arm 104. The magamps control a reversing clutch 113 driven from motor 57 through reduction gear 114 and shaft 115. The magamps are connected to the coils of the reversing clutch through common lead 116 and leads 117 and 118. The reversing clutch drives an output shaft 119 which is coupled to arm 104 to keep the bridge in null condition. The angular position of shaft 119 is, therefore, an indication of turbine temperature.

The area bridge 68 differs from those previously described in that it has three inputs fed into the sides of the bridge. One circuit through the bridge is from bus 59 through fixed resistance 121, potentiometer 46, and fixed resistance 122. The other circuit is from bus 59 through potentiometers 123, 124, and 125 to bus 60. The output circuit of the bridge is from movable arm 127 of potentiometer 46, which is moved in response to nozzle area, through lead 128, magamp 129, magamp 131, and lead 132 to movable arm 133 of potetniometer 124. Potentiometers 123 and 125 have movable arms 123' and 125', respectively, which are connected to shunt a part of the potentiometer resistance. These arms are connected to shaft 94 for movement thereby, as indicated by the legend S. Arm 123' is moved to decrease the resistance of potentiometer 123 as arm 125' moves to increase the resistance of 125. The total resistance through 123, 124, and 125 is thus maintained constant. However, the potential impressed on the output circuit at slider 133 is varied by speed. Arm 133 is mechanically coupled to shaft 119 so that the E.M.F. at arm 133 is also varied by temperature. It will be seen, therefore, that for any pair of values of speed and temperature there will be a value of nozzle area which moves arm 127 to a point at which the potential in the area bridge output circuit is zero. If it is not zero, one or the other of magamps 129 and 131 energizes one or the other of the clutches in the reverse clutch device 29 to vary nozzle area until the bridge circuit is brought to its null condition. Magamps 129 and 131 are connected to the clutch device 29 through a common lead 120 and individual leads 130 and 140. The magamps 129 and 131 operate in the same manner as those previously described. They will naturally be higher power devices because the larger reversing clutch 29 which transmits power to vary the nozzle will require a higher current for control.

In the system illustrated, the quantity which is directly controlled by the pilot or engineer is fuel flow. Fuel flow is determined by the position of a pilot's power control lever 135 and by engine temperature and speed. The power control lever is coupled by any suitable connection indicated at 134 to the movable arm 136 of a potentiometer 137 in the fuel bridge 70. Potentiometer 137 is connected between resistors 138 and 139 across busses 59 and 60. Bridge 70 also includes potentiometers 141, 142, and 143 connected in series across the busses. These potentiometers are similar to potentiometers 123, 124, and 125 previously described. Arms 146 and 148 of potentiometers 141 and 143 are moved concurrently by the temperature shaft 119. Arm 147 of potentiometer 142 is moved by the speed shaft 94. The output circuit of this bridge is from arm 136 through lead 151, D.C. generator 44 of the flow meter 41, lead 152, magamps 153 and 154, and lead 156 to arm 147. It will be seen that the balance of this bridge is affected by the fuel demand signal from the control lever 135 actual fuel supply, speed, and temperature. Put another way, for any fuel demand called for by the pilot through lever 135 and any given combination of engine speed and temperature, there is a value of fuel flow which will produce zero current in the output circuit. This is the fuel flow called for by the control or computer. If the fuel flow differs from that called for, the magamps energize the reversing clutch 39 which acts through pump control 37 to increase or decrease the output of fuel pump 34. The magamps are connected to the reversing clutch 39 through common lead 160 and leads 161 and 162.

For clarity of the wiring diagram, the connections between the shafts 94 and 119 and the potentiometers adjusted by them are indicated schematically in FIGURE 1. As a matter of practical structure, all of these parts would be included in a computer assembly which could be mounted remote from the engine, since it is connected to the engine only through electrical leads. Also, in such a structure, the potentiometers driven by shaft 94 or shaft 119 would ordinarily be ganged on the shaft and connected by short leads within the computer to the remaining parts of the several bridge circuits. Also, the reduction gear and the reverse clutch shown as separate units on the schematic of FIGURE 1 may in practice be combined in a single structural unit. These considerations are illustrated somewhat schematically in FIGURE 4 which shows the speed potentiometer and clutch structure. As illustrated, the reduction gear and reverse clutch are combined in a unit 88, 89 driven by shaft 90 from motor 57. Leads 91, 92, and 93 control the energization of the electric clutches coupling shaft 90 to driven shaft 94. Potentiometers 77, 123, 125, and 142 are mechanically fixed to the reduction gear and reverse clutch device. The arms of the potentiometers (not illustrated in FIGURE 4) are driven by shaft 94. The three leads to each potentiometer are also indicated in FIGURE 4, those which have been identified by reference numerals in FIGURE 1 being so identified in FIGURE 4.

While presumably the operation of the control system will be clear from the foregoing, it may be well to describe it briefly. Let us assume that the engine is in operation in a steady state cruise condition, and the pilot desires additional power. Because the engine is in a steady state, all of the reversing clutches will be declutched and all of the bridge circuits will be in their null condition. Now, if the power lever 135 is moved to the right to call for more fuel and thus more power, the fuel bridge is unbalanced. The current in the output circuit will operate magamp 153 to engage the increase clutch in the reversing clutch 39 and increase the displacement of the fuel pump. The displacement will increase progressively until the increased fuel flow raises the E.M.F. of generator 44 to a value which balances the bridge. Concurrently with the increase in fuel flow, the speed and temperature of the engine will increase, which by increasing the voltage of generator 63 and that of the output of thermocouple amplifier 49 will unbalance the speed and temperature bridges. These bridges will energize the reversing clutches 88 and 113 to drive the potentiometers 79 and 104 to reflect the changes in speed and balance the speed and temperature bridges, respectively. Shafts 94 and 119 will move in accordance with these changes. The speed and temperature potentiometers in the fuel bridge will also be moved by shafts 94 and 119 to monitor the fuel increase. The speed and temperature potentiometers in the fuel bridge will move in such a direction with increase in engine speed and temperature as also to tend to rebalance the bridge output circuit. As fuel flow, speed and temperature increase, the fuel bridge is moved toward a balanced condition and when it becomes balanced, the fuel pump control mechanism will no longer be driven. New and higher stable values of fuel flow, temperature, and speed will have been established.

The foregoing summary does not take into account the further effect of nozzle area. As engine speed increases, the potentiometer arms 123' and 125' are driven in a direction to call for reduced nozzle area and potentiometer arm 133 is driven by the increased temperature signal in the direction to call for greater nozzle area. The potentiometers 123, 124, and 125 are calibrated to provide the most desirable nozzle area for the existing dependent parameters of speed and temperature. The calibration of these for any particular engine is a matter of engine characteristics. Assuming that the call for increased power creates a resultant demand from the speed and temperature potentiometers in the area bridge for reduced nozzle area, the area bridge will provide a current in its output shaft which, through magamp 131, energizes reversing clutch 29 to close the nozzle. The nozzle will close until the potentiometer arm 127 has been moved to rebalance the area bridge. This change will, of course, be going on at the same time as the change in fuel rate and will influence the changes in speed and temperature. The combined effect of the change in fuel and the change in nozzle area acting through the speed and temperature input bridges and servomechanisms will result in new values of nozzle area and fuel flow.

The computer will, of course, also respond to changes in engine operating parameters resulting from other factors, such as changes in engine speed or temperature due to changes in ambient atmospheric conditions or forward speed of the aircraft, for example.

In starting the engine, it will be cranked by an external source of power until it has reached a speed suited to introduction of fuel. Supply of fuel may be initiated by a shutoff valve (not shown) at a suitable cranking speed, as is customary. It is preferred that the generator 51 provide sufficient power to operate the computer at this speed of the engine. If it is desired to reduce the size of generator 51, leads 53 and 54 may be energized during starting through switch 55 from the alternating current supply lines of the aircraft.

Since all of the reversing clutches 39, 29, 88, and 113 are driven by the engine at a speed proportional to engine speed, the response rate of the output shafts of these clutches will always be in a constant ratio to each other. By suitably gearing these devices, the effective response rate or rate of change of the outputs of the servo clutches 88 and 113 which transmit the values of the dependent parameters, speed and temperature, to the computer may be maintained greater than the rate of change of fuel or area effected by the clutches 39 and 29. The rate of response of each servo is constant for any given value of engine speed. Since the rates are constant and not dependent upon the magnitude of the error, as is the case with linear servomechanisms, and because the dependent parameter servomechanisms respond more rapidly than the independent parameter servomechanisms, the changes in the independent parameters cannot occur more rapidly than the changes in the dependent parameters can be sensed and fed to the computer bridges. As a result, the control is inherently stable, although simple and direct in action.

As has been stated, the values of speed and temperature fed into the area and fuel bridges are monitoring values. Thus, speed and temperature determine nozzle area and speed and temperature coact with power lever position to determine fuel flow. It is entirely practicable with a system of the character described to employ the independent parameters for a limiting rather than a monitoring control if desired. This is illustrated by FIGURE 5, which shows a modified fuel bridge 170 which may be employed in a system otherwise identical to that of FIGURE 1. The parts of bridge 170 which are the same as those of bridge 70 are identified by the same reference numerals. The essential difference between bridge 170 and bridge 70 is that the speed and temperature potentiometers are modified so that they do not monitor fuel flow but act only to limit fuel flow to prevent excessive speed or temperature of the engine. The lower circuit of bridge 170 comprises potentiometers 181, 182, and 183, and a fixed resistor 189 in series. Each of the potentiometers includes a portion which is of negligible resistance over which the potentiometer arm moves in the low temperature or low speed values below the limits which have been set. The potentiometer arms 186, 187, and 188 are indicated in the position corresponding to low engine speed and temperature such as would be the case with the engine shut down. These arms move respectively over the negligible resistance portions 181', 182', and 183' of the potentiometers through the normal temperature and speed ranges of the engine. If speed becomes excessive, arm 187 moves onto the resistance portion of potentiometer 182, unbalancing the output circuit to cause a reduction of fuel. Similarly, if the temperature arms 186 and 188 move onto the resistance portions of the potentiometers, a signal to reduce fuel is generated by the bridge.

It should be pointed out that the particular arrangements of bridge circuits described with reference to FIGURES 1 and 5 are merely illustrative of a system embodying the invention. Many different types of bridge circuits can be arranged depending upon the nature of the control desired. Any engine quantity which may be expressed as a potential or a resistance variation may be fed into the bridge circuits. Any quantity which may be measured may be converted into a shaft rotation by appropriate servomechanism to vary a resistance.

The principles of the invention are not limited to an electromechanical system such as that described. The constant velocity characteristic and the correlation of the response velocity of the servomechanism may be achieved with mechanisms of other types. A mechanical gearing can serve the same function as the bridge circuits in combining and correlating various quantities for control purposes, for example.

However, the electromechanical system illustrated is believed to be highly advantageous because of the simplicity, reliability and light weight of the components. A computing mechanism of the character described could weigh as little as about fifteen pounds. Calibration of the control to engines of different characteristics may be accomplished simply by substitution of resistors and potentiometers of different resistance values.

So far as the control of fuel flow and area is concerned, the system eliminates complicated hydraulic fuel controls usually employed and provides a light and compact mechanism capable of handling the rather large force required to vary nozzle area.

Since the electrical system is energized from the tachometer generator 51 of the engine, it is not dependent upon sources of electrical power external to the engine. Such external sources are subject to rapid and substantial variations in voltage when loads are put on them, which variations are detrimental to smooth and accurate function of the engine controls.

The detailed description of the preferred embodiments of the invention for the purpose of explaining the principles thereof is not to be construed as limiting the invention, as many modifications may be made by the exercise of skill in the art within the principles of the invention.

We claim:

1. A control system for a gas turbine engine including a regulatable fuel supply means, the control system comprising, in combination, a manually operable power control, engine speed responsive means, engine turbine temperature responsive means, a computer connected to and actuated by the power control and the said responsive means, nonlinear input servomechanisms having substantially constant-velocity response characteristics coupling the speed responsive and temperature responsive means to the computer, the computer including means for regulating the value of engine fuel flow, and a nonlinear output servomechanism having substantially constant-velocity response characteristics coupling the regulating means of the computer to the fuel supply means, the said input servomechanism having faster response rates than the said output servomechanism.

2. A control system for a gas turbine jet engine including a regulatable fuel supply means and a variable area jet nozzle, the control system comprising, in combination, a manually operable power control, engine speed responsive means, engine turbine temperature responsive means, a computer connected to and actuated by the power control and the said responsive means, nonlinear input servomechanisms having substantially constant-velocity response characteristics coupling the speed responsive and temperature responsive means to the computer, the computer including means for regulating the values of engine fuel flow and nozzle area, and nonlinear output servomechanisms having substantially constant-velocity response characteristics coupling the regulating means of the computer to the fuel supply means and the variable area jet nozzle, the said input servomechanisms having faster response rates than the said output servomechanisms.

3. A control system for a gas turbine jet engine including a variable area jet nozzle, the control system comprising, in combination, engine speed responsive means, engine turbine temperature responsive means, a computer connected to and actuated by the said responsive means, nonlinear input servomechanisms having substantially constant-velocity response characteristics coupling the speed responsive and temperature responsive means to the computer, the computer including means for regulating the value of engine nozzle area, and a nonlinear output servomechanism having substantially constant-velocity response characteristics coupling the regulating means of the computer to the variable area jet nozzle, the said input servomechanisms having faster response rates than the said output servomechanism.

4. An engine control system comprising, in combination, means for regulating an independent parameter determinative of a characteristic of engine operation, means for measuring a dependent parameter indicative of the said characteristic of engine operation, operating means connected to the regulating means operable to vary the independent parameter, and control means connected to the measuring means for actuation thereby and to the operating means for actuation thereof, the operating means and the control means including non-linear servomechanisms having substantially constant-velocity response characteristics, and the servomechanism in the control means having a faster response rate than the servomechanism in the operating means.

5. A gas turbine jet engine control system comprising, in combination, means for regulating an independent parameter determinative of the characteristics of engine operation, means for measuring dependent parameters indicative of the characteristics of engine operation, operating means connected to the regulating means operable to vary the independent parameter, and control means connected to the measuring means for actuation thereby and to the operating means for actuation thereof, the operating means and the control means including nonlinear servomechanisms having substantially constant-velocity response characteristics, and the servomechanisms in the control means having faster response rates than the servomechanism in the operating means.

6. A gas turbine engine control system comprising, in combination, means for regulating fuel flow as an independent parameter determinative of the characteristics of engine operation, means for measuring dependent parameters indicative of the characteristics of engine operation, operating means connected to the regulating means operable to vary the fuel flow, and control means connected to the measuring means for actuation thereby and to the operating means for actuation thereof, the operating means and the control means including nonlinear servomechanisms having substantially constant-velocity responsive characteristics, and the servomechanisms in the control means having faster response rates than the servomechanism in the operating means.

7. A gas turbine jet engine control system comprising, in combination, means for regulating nozzle area as an independent parameter determinative of the characteristics of engine operation, means for measuring dependent parameters indicative of the characteristics of engine operation, operating means connected to the regulating means operable to vary the nozzle area, and control means connected to the measuring means for actuation thereby and to the operating means for actuation thereof, the operating means and the control means including nonlinear servomechanisms having substantially constant-velocity response characteristics, and the servomechanisms in the control means having faster response rates than the servo-mechanism in the operating means.

8. A gas turbine jet engine control system comprising, in combination, means for regulating fuel flow and nozzle area as independent parameters determinative of the characteristics of engine operation, means for measuring dependent parameters indicative of the characteristics of engine operation, operating means connected to the regulating means operable to vary the fuel flow and nozzle area, and control means connected to the measuring means for actuation thereby and to the operating means for actuation thereof, the operating means and the control means including nonlinear servomechanisms having substantially constant-velocity response characteristics, and the servomechanisms in the control means having faster response rates than the servomechanisms in the operating means.

9. A control system for a turbojet engine including a regulatable fuel supply means, the control system comprising, in combination, a manually operable power control, engine speed responsive means, engine turbine temperature responsive means, and engine fuel flow responsive means, the said responsive means providing D.C. E.M.F.'s proportional to the values of the quantities responded to; a speed bridge coupled to the speed responsive means and including a rebalancing potentiometer and a speed servomotor driven by the engine, including reversing mechanisms controlled by the speed bridge, connected to drive the rebalancing potentiometer; a temperature bridge connected to the turbine temperature responsive means and including a rebalancing potentiometer and a temperature servomotor driven by the engine, including reversing mechanism controlled by the temperature bridge, connected to drive the temperature bridge rebalancing potentiometer; a fuel bridge connected to the power control and the fuel flow responsive means including a speed input potentiometer driven by the speed servomotor and a temperature input potentiometer driven by the temperature servomotor; a fuel servomotor driven by the engine controlling the output of the fuel supply means, and means actuated by the fuel bridge controlling the fuel servomotor; the said servomotors being characterized by substantially constant-velocity output rates, and the speed and temperature servomotors having faster response rates than the fuel servomotor.

10. A control system for a turbojet engine including a regulatable fuel supply means, the control system comprising, in combination, a manually operable power control, engine speed responsive means, engine turbine temperature responsive means, and engine fuel flow responsive means, the said responsive means providing D.C. E.M.F.'s proportional to the values of the quantities responded to; a speed bridge coupled to the speed responsive means and including a rebalancing potentiometer and a speed servomotor driven by the engine, including reversing mechanisms controlled by the speed bridge, connected to drive the rebalancing potentiometer; a temperature bridge connected to the turbine temperature responsive means and including a rebalancing potentiometer and a temperature servomotor driven by the engine, including reversing mechanism controlled by the temperature bridge, connected to drive the temperature bridge rebalancing potentiometer; a fuel bridge connected to the power control and the fuel flow responsive means including a speed input potentiometer driven by the speed servomotor and a temperature input potentiometer driven by the temperature servomotor; a variable displacement fuel pump driven by the engine and supplying fuel thereto, a fuel servomotor driven by the engine controlling the displacement of the pump, and means actuated by the fuel bridge controlling the fuel servomotor; the said servomotors being characterized by substantially constant-velocity output rates, and the speed and temperature servomotors having faster response rates than the fuel servomotor.

11. A control system for a turbojet engine including a regulatable fuel supply means and a variable area jet nozzle, the control system comprising, in combination, a manually operable power control, engine speed responsive means, engine turbine temperature responsive means, engine fuel flow responsive means, and engine nozzle area responsive means, the said responsive means providing D.C. E.M.F.'s proportional to the values of the quantities responded to; a speed bridge coupled to the speed responsive means and including a rebalancing potentiometer and a speed servomotor driven by the engine, including reversing mechanisms controlled by the speed bridge, connected to drive the rebalancing potentiometer; a temperature bridge connected to the turbine temperature responsive means and including a rebalancing potentiometer and a temperature servomotor driven by the engine, including reversing mechanism controlled by the temperature bridge, connected to drive the temperature bridge rebalancing potentiometer; a fuel bridge connected to the power control and the fuel flow responsive means including a speed input potentiometer driven by the speed servomotor and a temperature input potentiometer driven by the temperature servomotor; a variable displacement fuel pump driven by the engine and supplying fuel thereto, a fuel servomotor driven by the engine controlling the displacement of the pump, means actuated by the fuel bridge controlling the fuel servomotor; a nozzle area bridge connected to the area responsive means including a speed input potentiometer driven by the speed servomotor and a temperature input potentiometer driven by the temperature servomotor; and jet nozzle area varying servomotor means driven by the engine, means actuated by the nozzle area bridge controlling the area varying servomotor means; the said servomotors being characterized in substantially constant-velocity output rates, and the speed and temperature servomotors having faster response rates than the fuel and area servomotors.

12. A control system for a turbojet engine including a regulatable fuel supply means and a variable area jet nozzle, the control system comprising, in combination, a manually operable power control, engine speed responsive means including an alternator driven by the engine, a synchronous motor energized by the alternator, and a D.C. tachometer generator driven by the said motor; engine turbine temperature responsive means, engine fuel flow responsive means, and engine nozzle area responsive means, the said responsive means providing D.C. E.M.F.'s proportional to the values of the quantities responded to; a speed bridge coupled to the tachometer generator and including a rebalancing potentiometer and a speed servomotor driven by the alternator, including reversing mechanisms controlled by the speed bridge, connected to drive the rebalancing potentiometer; a temperature bridge connected to the turbine temperature responsive means and including a rebalancing potentiometer and a temperature servomotor driven by the alternator, including reversing mechanism controlled by the temperature bridge, connected to drive the temperature bridge rebalancing potentiometer; a fuel bridge connected to the power control and the fuel flow responsive means including a speed input potentiometer driven by the speed servomotor and a temperature input potentiometer driven by the temperature servomotor; a variable displacement fuel pump driven by the engine and supplying fuel thereto, a fuel servomotor driven by the engine controlling the displacement of the pump, means actuated by the fuel bridge controlling the fuel servomotor; a nozzle area bridge connected to the area responsive means including a speed input potentiometer driven by the speed servomotor and a temperature input potentiometer driven by the temperature servomotor; jet nozzle area varying servomotor means driven by the engine, means actuated by the nozzle area bridge controlling the area varying servomotor means; and a D.C. power supply energizing the said bridges energized by the said alternator; the said servomotors being characterized by substantially constant-velocity response rates, and the speed and temperature servomotors having faster response rates than the fuel and area servomotors.

13. A control system for a gas turbine engine including a regulatable fuel supply means, the control system comprising, in combination, a manually operable power control, engine speed responsive means, engine turbine temperature responsive means, engine fuel flow responsive means, a computer connected to and actuated by the power control and the said responsive means, nonlinear input servomechanisms having substantially constant-velocity response characteristics coupling the speed responsive and temperature responsive means to the computer, the computer including means for establishing a value of engine fuel flow and means for regulating fuel flow responsive to the difference between the established value and the measured value ascertained by the fuel flow responsive means, and a nonlinear output servomechanism having substantially constant-velocity response characteristics coupling the regulating means of the computer to the fuel supply means, the said input servomechanisms having faster response rates than the said output servomechanism.

14. A control system for a gas turbine jet engine including a regulatable fuel supply means and a variable area jet nozzle, the control system comprising, in combination, a manually operable power control, engine speed responsive means, engine turbine temperature responsive means, engine fuel flow responsive means, engine nozzle area responsive means, a computer connected to and actuated by the power control and the said responsive means, nonlinear input servomechanisms having substantially constant-velocity response characteristics coupling the speed responsive and temperature responsive means to the computer, the computer including means for establishing values of engine fuel flow and nozzle area and means for regulating fuel flow and nozzle area, respectively, responsive to the differences between the established values thereof and the measured values thereof ascertained by the means responsive thereto, and nonlinear output servomechanisms having substantially constant-velocity response characteristics coupling the regulating means of the computer to the fuel supply means and the variable area jet nozzle, the said input servo-mechanisms having faster response rates than the said output servomechanisms.

References Cited in the file of this patent

UNITED STATES PATENTS

| | | |
|---|---|---|
| 2,233,634 | Newton | Mar. 4, 1941 |
| 2,275,317 | Ryder | Mar. 3, 1942 |
| 2,425,733 | Gille et al. | Aug. 19, 1947 |
| 2,671,881 | Dicke | Mar. 9, 1954 |
| 2,675,510 | Belcher | Apr. 13, 1954 |
| 2,800,015 | Shaw | July 23, 1957 |
| 2,805,543 | Lowry et al. | Sept. 10, 1957 |
| 2,835,861 | Eckhardt | May 20, 1958 |
| 2,944,387 | Hall | July 12, 1960 |